Aug. 4, 1931.  H. F. BÜHRIG  1,817,232
APPARATUS FOR TEMPERATURE REGULATION
Filed Jan. 22, 1926  2 Sheets-Sheet 1
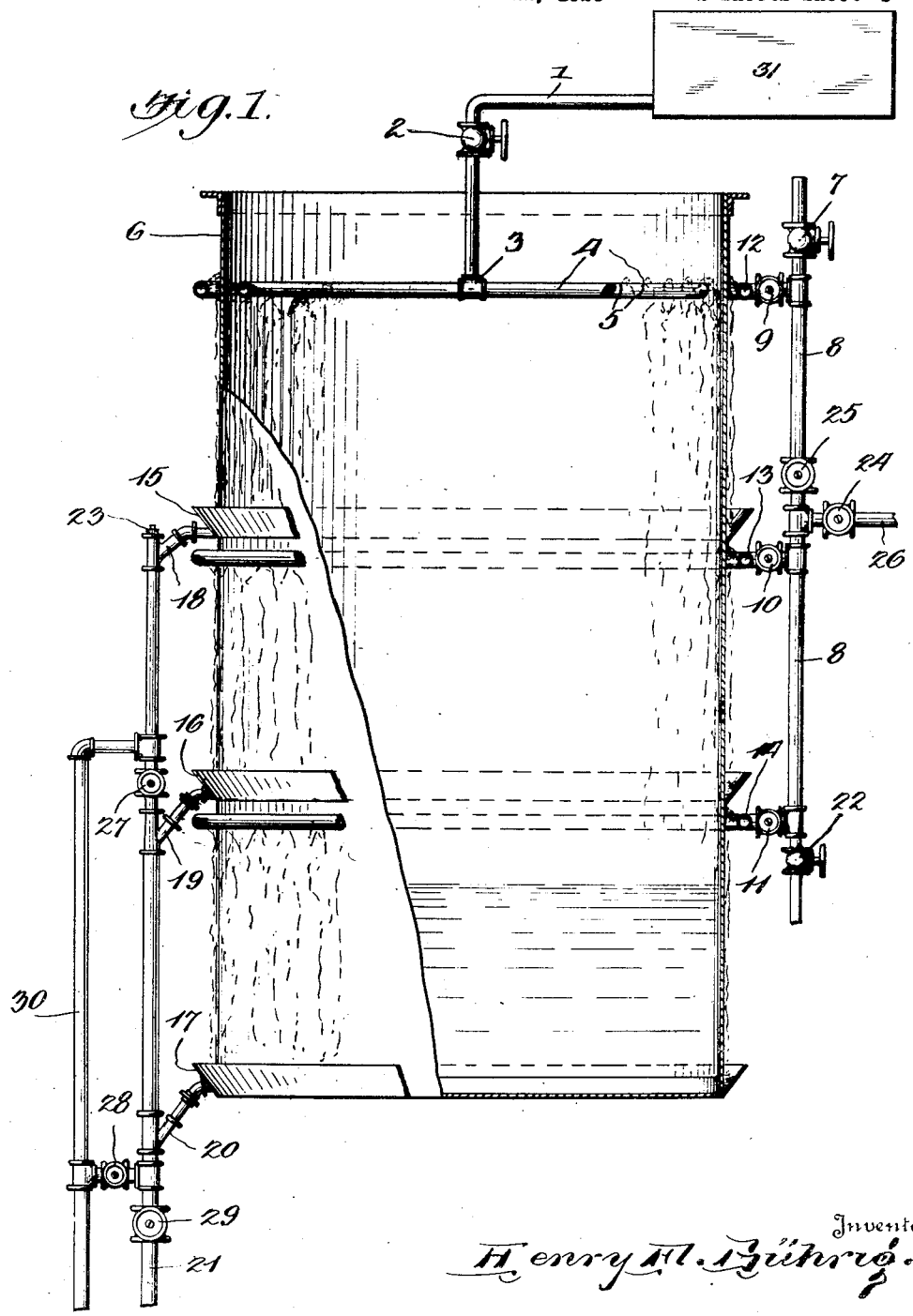

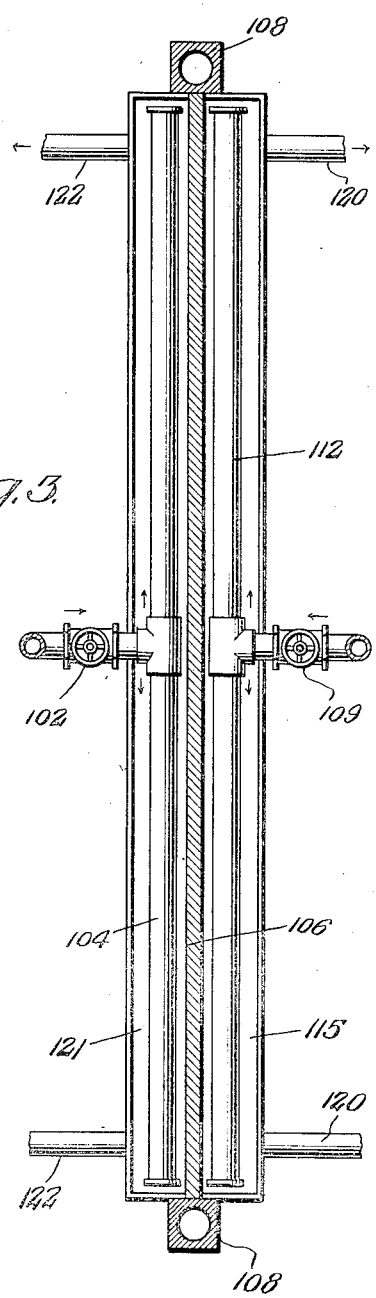
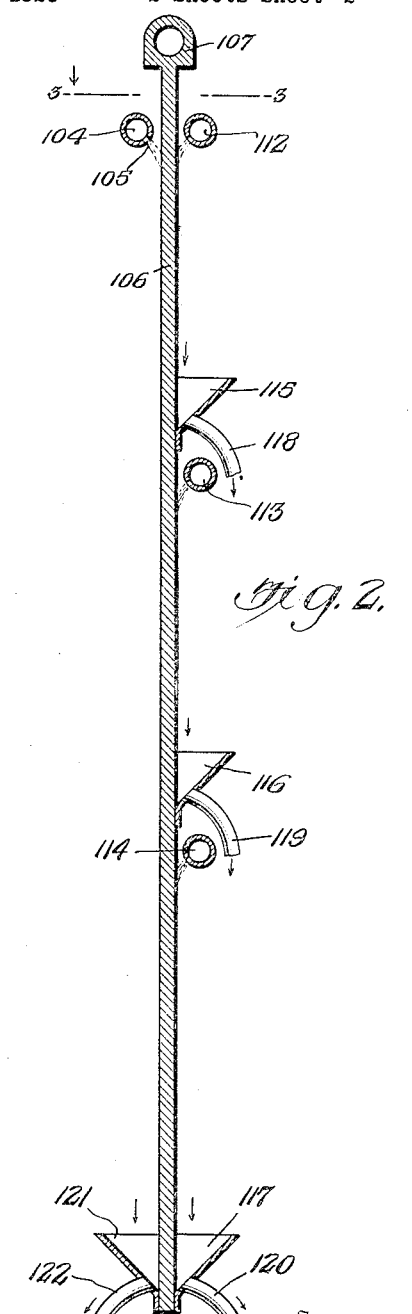

Patented Aug. 4, 1931

1,817,232

UNITED STATES PATENT OFFICE

HENRY F. BÜHRIG, OF CHICAGO, ILLINOIS, ASSIGNOR, BY MESNE ASSIGNMENTS, TO STANDARD BRANDS INCORPORATED, OF DOVER, DELAWARE, A CORPORATION OF DELAWARE

APPARATUS FOR TEMPERATURE REGULATION

Application filed January 22, 1926. Serial No. 83,071.

My invention relates in general to an apparatus for regulating temperature of materials, particularly materials of the liquid type.

More particularly, my invention relates to and has as an object, the cooling of liquids in contact with a heat conducting septum by causing a second liquid to flow over the opposite side of the septum in a manner such that the cooling shall take place in a convenient, efficient and economical manner.

My invention is particularly adapted to be applied to the cooling of nutrient solutions in the production of yeast, especially in those processes of the type known as "Continuous addition processes", and has for a further object the carrying out of such processes with improved and regulated temperature control.

Other objects of the invention will in part be obvious and will in part appear hereinafter.

The invention accordingly comprises the apparatus embodying features of construction, combinations of elements and arrangement of parts which are adapted to effect such regulation as is exemplified in the following detailed disclosure, and the scope of the application of which will be indicated in the claims.

For a fuller understanding of the nature and objects of the invention, reference should be had to the following detailed description taken in connection with the accompanying drawings, in which:

Figure 1 is a side elevation partly in section, showing a specific embodiment of my apparatus applied to a propagating vat or commonly so-called "fermenter" adapted to be used in yeast manufacture;

Figure 2 is a transverse sectional view of a simple embodiment of my apparatus; and Figure 3 is a plan view, partly in section, of the device shown in Figure 2, such section being taken along the dotted line 3—3 as indicated on Figure 2.

Heretofore in the commercial manufacture of yeast it has been a common practice to conduct the yeast propagation in large tanks often formed of copper over the outer surface of which a cooling liquid, usually water, has been allowed to flow at suitable temperature for preventing undue rise of the temperature of the material within the tank during the yeast growth. In such prior processes, however, in which the cooling liquid has been allowed to flow over a unitary zone comprising substantially the entire height of a usual fermenting tank, the cooling is not effected in the most efficient manner, one reason for this being that unless the cooling liquid is supplied in unduly large and wasteful quantities its temperature approximates that of the contents of the tank adjacent its inner surface after the cooling liquid has descended over a fraction only of the total height of the surface over which it flows. After this approximate equalization of temperature it no longer exerts any cooling effect while passing over the remaining surface of the tank.

In the preferred embodiment of my present invention a highly efficient method of cooling receptacles, for example tanks of copper or similar material used for yeast propagation, is provided for by subdividing the outer surface of the tank into a plurality of operatively separate and distinct zones one above another, each of which may be subjected to the action of separate portions of cooling liquid.

In the specific and preferred embodiment of my invention, as illustrated in Figure 1 of the drawings, a tank 6 which may be formed of sheet copper or other suitable heat conducting material may be used for the propagation of yeast in a suitable nutrient solution supplied to and contained in the tank. A tank of this character may be provided with suitable perforated pipes or other devices (not shown) for passing air through the contents of the tank, which devices, however, may be such as are well known in the art and form no part of my present invention. Exterior to the tank 6 a pipe 8 is provided for the supply of cold water or other cooling liquid, a regulated flow of which may be permitted as desired to annular pipes 12, 13 and 14 surrounding the tank 6. The flow to these pipes 12, 13 and 14 may be controlled by valves 9, 10 and 11, respectively. The annular pipes 12, 13 and 14 as shown are provided with numerous perforations through which the cooling liquid is discharged against the outer surface of the tank 6. This cooling liquid flows downwardly over the outer surface of the tank and being supplied at a suitably lower temperature than that of the contents of the tank abstracts heat from the latter through the tank wall until the cooling liquid by such heat interchange has attained approximately the same temperature as the tank contents adjacent its inner wall. Preferably at a level approximately that at which such maximum heat interchange is attained, collecting troughs or gutters 15, 16 and 17 are riveted and soldered or otherwise secured by a liquid-tight fastening to the outer surface of the tank, below the pipes 12, 13 and 14, respectively, in which troughs the cooling liquid collects and from which, through connections 18, 19 and 20, respectively, leading to an outlet pipe 21 through a control valve 29, the liquid may be either run to waste or may be led to a refrigerating plant or device (not shown) whence it may be returned to the pipe 8 for further use in cooling. The pipe 21 may be provided, as shown, with a suitable removable plug 23 or other removable closure to facilitate cleaning out the pipe when desired.

While in the drawings I have illustrated three separate cooling zones, one above another upon the exterior of a tank, for yeast propagation, it will be understood that a plurality of such separate zones may be provided of such number and extent as best fulfill the objects of the invention, depending somewhat upon the height of the tank and upon the initial temperature differences between the contents of the tank and of the cooling liquid employed.

In order to provide, if desired, for the use of cooling liquid of different temperatures or characters or from different sources upon different cooling zones in accordance with my invention, an additional supply pipe 26 may be provided through which by way of the control valve 24 a suitable cooling liquid may be supplied to one or more of the zones, for example through the valve 10 and pipe 13, or valve 11 and pipe 14, or both, while cooling liquid of different character or temperature or from a different source may be supplied to another of the cooling zones, for example by way of the valves 7 and 9 and pipe 12. Also, in order to keep the cooling liquids from different sources separate from each other after use, valves 25, 27, 28 and 29 may optionally be provided in connection with pipes 8, 21 and 30 for further controlling the separate supply and discharge of the cooling liquids after use, either to a disposal location or refrigerating apparatus for refrigeration, return and re-use on the tank.

In a specific embodiment of the invention as shown in the drawings, a pipe 1 may further be provided through which a solution may be supplied (from a reserve tank 31 or other source) through a valve 2, tee 3 and an annular pipe 4, which pipe is provided with numerous perforations 5 arranged to discharge the liquid against the inner surface of the tank wall, preferably at a level approximately that of the top of the uppermost cooling zone. With the use of a supply device of this character a yeast nutrient solution in heated condition (maintained at a sterilizing temperature if desired in the reserve tank 31) may be directly supplied to the tank 6 and preliminarily cooled, to a suitable temperature for initiating or continuing yeast propagation, as it flows down the inner surface of the tank and is subjected to heat interchange as hereinbefore described. In connection with such a cooling of the inflowing yeast-nutrient solution, the upper cooling zone of the tank (such a tank being commonly called a "fermenter" in yeast factory nomenclature) may, if found expedient, be supplied with refrigerating liquid at a lower temperature than that of the refrigerating liquid supplied to the lower zones. Such a differential cooling may be of especial advantage in case hot yeast-nutrient liquid is supplied to the "fermenter" after yeast propagation has been initiated in the "fermenter," in order to avoid any possibility of unduly high temperature being developed at any location within the "fermenter" such as might be injurious or lethal to the yeast present therein. Under some other circumstances, as for instance in supply of hot liquid through the pipes 1 and 4 before seed yeast has been added, it may be found more suitable and efficient to supply a cooling liquid of lower temperature to the lower than to the upper zones so that the heated yeast-nutrient liquid as supplied undergoes heat interchange with different cooling media which are successively of lower temperatures.

While as hereinbefore described, my apparatus and process are particularly suitable and adapted for use in connection with the cooling of liquid contained within or flowing down the inner surfaces of the walls of tanks, such as metallic "fermenters" used in yeast production, my invention in a broader adaptation may also be advantageously applied to the cooling of substances, particularly liquid substances, in a similar manner while flowing down upon one side of a metallic or other heat-conducting septum, whether or not the latter constitutes a tank wall. Such a broader embodiment and adaptation of my invention is shown in Figures 2 and 3 of the drawings, in which 106 represents a heat conductive material which may, for example, be in the form of a vertical plate or sheet formed of copper, aluminum or other heat conducting material suitable for the particular purpose involved, and which may be supported vertically in any suitable or preferred manner, such as by a horizontal cross-bar 107 at its top and by vertical supports 108 at its edges. As shown in Figures 2 and 3, the material to be cooled, which may be either a yeast-nutrient liquid or other substance, may be supplied through a pipe 104, from perforations 105 in which the material flows against the upper portion of the heat conducting septum 106 and flows downwardly thereon and eventually is collected in a trough 121, which may be positioned at the lower edge of the septum 106 or may be collected by other suitable means. In the embodiment of the invention, as illustrated in Figures 2 and 3, lead-off pipes 122 are provided from the collection trough 121, for collecting and drawing off the cooled material. As also shown in Figures 2 and 3, the septum 106 may be provided on its opposite side with a plurality of zones (three in number, as shown in Figure 2, although two or any greater number of such zones may be provided without departing from my invention). The upper portion of each of these zones may be supplied either from the same or from different sources with cold water, refrigerated brine or other cooling material through pipes such as shown at 112, 113 and 114 and the cooling material after flowing downwardly over the zone to which it is applied is collected and withdrawn from the lower portion of the zone by collecting troughs 115, 116 and 117 and lead-off pipes 118, 119 and 120, or by other equivalent or suitable means.

In certain processes it may be found desirable or advantageous to cool yeast-nutrient solutions or liquids by an independent device, embodying my invention as shown in Figures 2 and 3, before the solution or liquid is introduced into a tank or "fermenter" for yeast production or otherwise employed for the particular purpose for which the cooled material is used or adapted.

In the form of apparatus, shown in Figures 2 and 3, the supply of material to the pipe 104 may be accurately controlled by valve 102, while the supply of cooling material to the pipe 112 may be similarly controlled by valve 109, similar control valves being also provided for controlling the supply of liquid to the other cooling sources through the pipes 113 and 114.

A distinct advantage in the employment of my process and apparatus for cooling liquids is that by spraying the liquid to be cooled onto one side of a heat conducting wall or septum, while simultaneously spraying a cooling liquid on the other side of the septum, not only is an efficient heat exchange between the two liquids attained, but also the cooling effect due to evaporation is utilized in respect to both of the liquids whereby an efficiency of cooling effect is attained which would not be present were either of the two liquids confined. Further, by applying the cooling liquid in separate portions as described to a plurality of cooling zones situated one above another, upon one side of the heat conductive septum and withdrawing it from the lower portion of each zone after flowing thereover, atmospheric evaporation facilitates the cooling effect and an additional efficiency of cooling is attained because a considerably larger volume of cooling liquid can be used without the usual increase in thickness of the descending wall of liquid on the surface of the septum, such as occurs if the latter is not subdivided into zones in accord with my invention.

In conformity with the particular character and degree of cooling or temperature change of the treated liquid, which it is desired shall be effected, my apparatus, in any of its embodiments (such as for example those shown in Figures 2 and 3 or in Figure 1), may be provided with connections for applying liquids from different sources or at different temperatures to the different zones. For such purpose suitable pipe connections and valves may optionally be provided for the apparatus shown in Figures 2 and 3 as are shown in Figure 1, for controlling the ingress and egress of liquid to and from the cooling zones. In some instances, in employing an apparatus of the general type illustrated in Figure 1 for carrying on yeast production by a "continuous supply process" in which hot liquid is supplied from a reserve tank to the upper portion of the inner surface of the "fermenter" wall, it may be found sufficiently satisfactory and advantageous to divide the outer surface of the "fermenter" wall into two zones, the upper of which serves for preliminary cooling of the hot liquid from the reserve tank to bring its temperature down to a point which will be harmless to the yeast in the "fermenter" (employing refrigerated brine if desired on this cooling zone) while the lower zone (which may be supplied with water or other cooling liquid of a somewhat higher temperature than the brine or other cooling liquid applied to the upper zone) serves for heat interchange with the material in contact with the lower portion of the inner surface of the "fermenter" wall. A like process of suitable selective zone cooling may be applied to a heat interchange apparatus as shown in Figures 2 and 3 by providing the same with suitable pipe connections, valves and supplies of cooling liquids of predeterminedly different temperatures. In whatever form my apparatus may be constructed, the cooling liquid flowing off from any one or more or all of the cooling zones, may optionally be led through a suitable extraneous cooling device of any well known or desired character and thence returned to the same or another of the zones of my apparatus.

In certain instances, as, for example, in the embodiment of my invention as shown in Figure 1 of the drawings, I have found it to be especially advantageous, for efficient cooling, to position the outlet holes in the pipes 4, 12, 13 and 14 at an upward inclination of about 45° (toward the wall through which heat exchange occurs), and, in a cooling system for a "fermenter" of usual factory size, these holes may advantageously be spaced about one inch apart and have a diameter of about one-eighth inch. It is, however, to be understood that my invention is not to be construed as limited to this size, spacing or inclination of the holes for supplying liquid, as these features, although involving especial advantage and efficiency in installations of the type illustrated in Figure 1, may be varied without departing from the salient and essential features of my invention as defined in the claims hereto appended.

Having described my invention, what I claim as new and desire to secure by Letters Patent is:

1. An apparatus adapted for carrying out chemical or biological processes at a controlled temperature, comprising a receptacle having a wall of material which possesses good heat conducting properties, the exterior of said wall being divided into a plurality of cooling zones, each provided with means for supply and uniform distribution of cooling liquid against the outer surface of the wall in such relation thereto that the cooling liquid is caused to flow over the surface of the zone to which it is supplied and provided also with means for independently regulating the supply of cooling liquid to each zone and with means for removing the supplied liquid from each zone at approximately that location where the said liquid has approximately spent its cooling effect and has attained a temperature very nearly equal to that of the contents of the receptacle adjacent the zone.

2. In an apparatus adapted for effecting heat interchange between a plurality of liquids, a septum of heat-conducting material in substantially vertical position, means for supplying a liquid to the upper portion of one side of the septum so that it may flow downwardly thereover, and, in combination therewith, means for supplying a temperature-regulating liquid to each of a plurality of zones situated one above another on the opposite side of the septum and means for withdrawing the temperature-regulating liquid after it has passed over the limited zone to which it is applied, said means for supplying temperature-regulating liquid being provided with outlets disposed at such an angle that liquid flows therefrom at an angle of about 45° upwardly against the septum.

3. In an apparatus adapted for effecting heat interchange between a plurality of liquids, a septum of heat-conducting material in substantially vertical position, means for supplying a liquid to the upper portion of one side of the septum so that it may flow downwardly thereover, and, in combination therewith, means for supplying a temperature-regulating liquid under separate control to each of a plurality of zones situated one above another on the opposite side of the septum and means for withdrawing the temperature-regulating liquid after it has passed over the limited zone to which it is applied, said means for supplying the temperature-regulating liquid being provided with outlets disposed at such an angle that liquid flows therefrom at an angle of about 45° upwardly against the septum.

4. An apparatus adapted for the propagation of yeast, comprising a tank formed of material readily conductive of heat, the exterior of said tank being divided into a plurality of superposed cooling zones and provided with independently regulable means for supplying and uniformly distributing a cooling liquid to the exterior surface of the tank at approximately the upper level of each zone and with means for withdrawing the cooling liquid at approximately the bottom of each of said zones.

5. An apparatus adapted for the propagation of yeast, comprising a tank formed of material readily conductive of heat, the exterior of said tank being divided into a plurality of superposed cooling zones and provided with independently regulable means for supplying and uniformly distributing a cooling liquid to the exterior surface of the tank at approximately the upper level of each zone and with means for withdrawing the cooling liquid at approximately the bottom of each of said zones, said zones being so proportioned relative to the temperatures and rates of flow of the liquids that the cooling liquid at the respective points of withdrawal will possess a temperature very nearly equal to that of the adjacent contents of the tank.

6. A heat-exchange apparatus, including a substantially vertically extending heat-conducting wall, means for flowing liquid to be treated over one face thereof, such liquid passing downwardly over said face in the form of a film, the opposite face of the wall being divided into zones, means on the latter wall face and adjacent the upper ends of said zones for bringing treating liquid into contact with such face, such latter liquid passing in a film over one of the wall zones, means adjacent the lower end of each of said zones for removing the treating liquid, and means for independently controlling the flow and effecting substantially uniform distribution of said treating liquid to each of said zones.

7. A heat-exchange apparatus, including, in combination, a heat-conducting wall, means for bringing liquid to be treated over one face thereof, the opposite face of such wall being divided into zones, and means adjacent the upper end of each zone for bringing and uniformly distributing treating liquid into contact with said latter wall face, such latter liquid passing therealong in the form of a film, each zone and the liquid passing thereover being exposed to the action of air.

8. A heat-exchange apparatus, including a heat-conducting wall, means for bringing a liquid to be treated into contact with one face of the wall, the opposite wall face being divided into zones, outlet troughs extending from such opposite face and defining the lower end of each of such zones, and independently controlled means for bringing treating liquid into contact with the upper end of each of such zones, such liquid passing over the last-named wall face and into the trough at the lower end of each zone.

9. In an apparatus adapted for carrying out a "continuous-addition" process of manufacturing yeast, in combination, a fermenter formed of heat conducting material, means for supplying yeast-nutrient liquid into the fermenter adjacent the top so that the liquid will flow downwardly over the inner face of the wall thereof and accumulate at the bottom of the fermenter, the outer face of said fermenter wall being equipped with independently controlled means for applying and removing treating liquid thereto in zones, whereby the temperature of the incoming nutrient liquid may be modified independently of the temperature of the accumulated liquid at the bottom of the fermenter.

In witness whereof, I have hereunto signed my name to this specification on the 16th day of January, 1926.

HENRY F. BÜHRIG.